US008014950B2

(12) United States Patent
Zhang

(10) Patent No.: US 8,014,950 B2
(45) Date of Patent: Sep. 6, 2011

(54) SYSTEM AND METHOD FOR SEISMIC TRACE ANALYSIS

(75) Inventor: Leonard Lin Zhang, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 748 days.

(21) Appl. No.: 12/142,065

(22) Filed: Jun. 19, 2008

(65) Prior Publication Data

US 2009/0319190 A1 Dec. 24, 2009

(51) Int. Cl.
*G01V 1/00* (2006.01)
(52) U.S. Cl. ......................................... 702/14
(58) Field of Classification Search .................. 702/11, 702/13, 14
See application file for complete search history.

(56) References Cited

U.S. PATENT DOCUMENTS

| 5,850,622 | A | 12/1998 | Vassiliou et al. |
| 6,668,228 | B1 | 12/2003 | Ozbeck et al. |
| 7,751,277 | B2 * | 7/2010 | Schonewille ............ 367/38 |
| 2003/0225524 | A1 | 12/2003 | Iranpour |

OTHER PUBLICATIONS

Xu, Sheng, Zhang, Yu, Pham, Don and Lambare, Gilles, Antileakage Fourier transform for seismic date regularization, Geophysics, vol. 70, No. 4 (Jul.-Aug. 2005); p. V87-V95, 17Figs. 10.1190/1.1993713.
Sheng Xu, Don Pham, Seismic Data Regularizarion with Anti-leakage Fourier Transform, EAGE 66th Conference & Exhibition, Paris, Frane, Jun. 2004.

* cited by examiner

*Primary Examiner* — Drew A Dunn
*Assistant Examiner* — Stephen Cherry
(74) *Attorney, Agent, or Firm* — Carlos L. Hanze

(57) ABSTRACT

Seismic data are processed to reduce or eliminate aliasing due, for example to sparse or irregular sampling. An iterative method includes an inhibiting function used in conjunction with a function evaluating a magnitude of Fourier coefficients that together act to reduce the effects of aliased energies and preferentially select true energies. Computational steps are conducted primarily in k-space, without returning to x-space, thereby reducing computational costs.

13 Claims, 5 Drawing Sheets

SYSTEM AND METHOD FOR SEISMIC TRACE ANALYSIS

BACKGROUND

1. Field of the Invention

The present invention relates generally to processing of geological data and more particularly to a system for reducing effects of aliasing in sampled data.

2. Description of the Related Art

Seismic surveys tend to produce sparsely and/or unevenly sampled data. This can result from uneven source and receiver position, system and navigation imperfection, culture obstacles and prohibitive cost of large instrument arrays. On the other hand, many data processing and visualization systems and methods require data that is densely and regularly sampled as input. As a result, it is often necessary to transform data such that it has an appropriate sampling basis.

SUMMARY

Aspects of embodiments of the present invention provide a method of method of processing a sampled seismic trace representing information relating to a subsurface region, including estimating Fourier coefficients of the seismic trace using a discrete Fourier transform, selecting the estimated Fourier coefficients by applying a coherence criterion to the estimated Fourier coefficients to reduce an amount of aliased energy represented, by the Fourier coefficients, re-orthogonalizing, in k-space, the Fourier coefficients, and using the re-orthogonalized Fourier coefficients to produce a seismic image of the subsurface region.

Aspects of embodiments of the present invention include a method of imaging a subsurface feature, including receiving a sampled seismic trace including information relating to the subsurface feature, estimating Fourier coefficients of the seismic trace using a discrete Fourier transform, selecting the estimated Fourier coefficients by applying a coherence criterion to the estimated Fourier coefficients to reduce an amount of aliased energy represented by the Fourier coefficients, re-orthogonalizing, in k-space, the Fourier coefficients, and applying an inverse Fourier transform to produce regularized seismic data.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
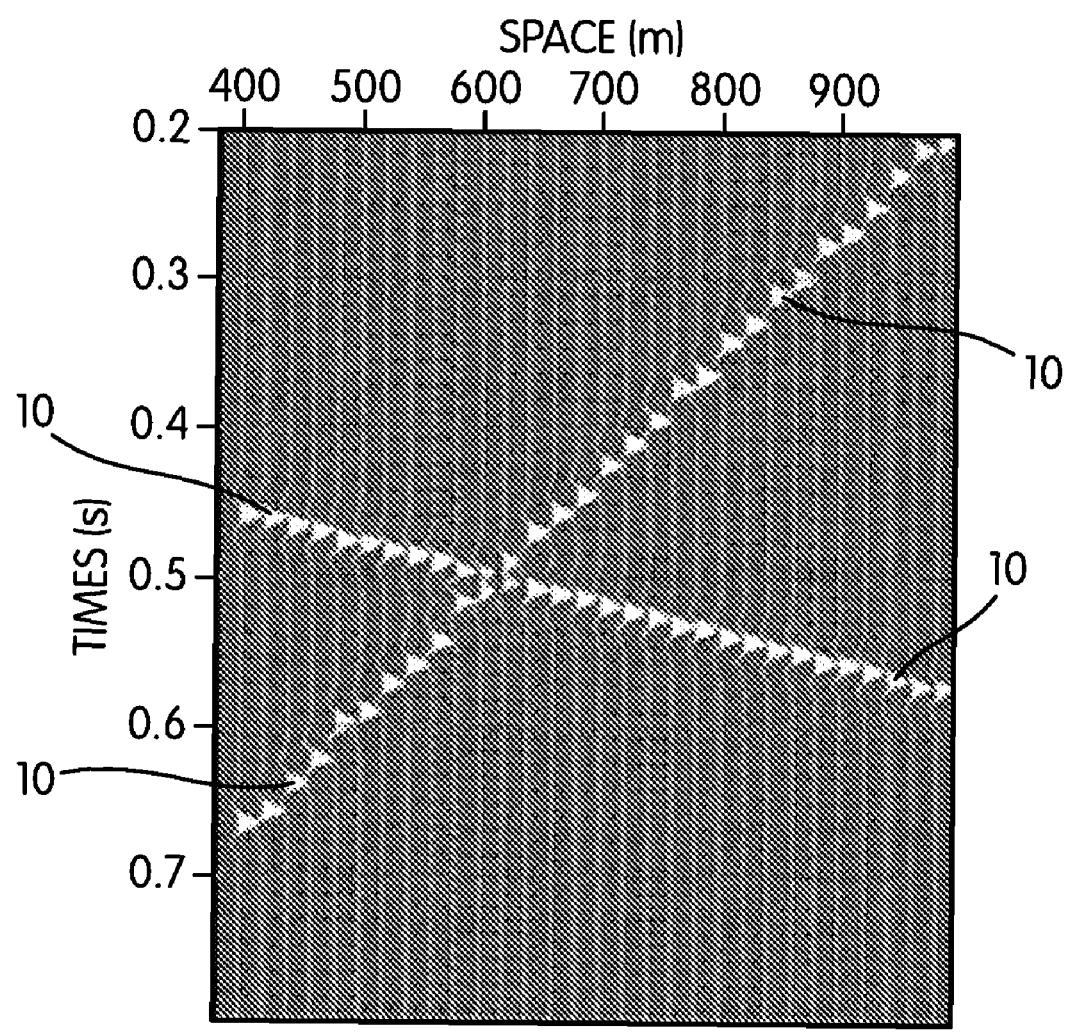
FIG. 1 illustrates an example of a gather of sampled traces.

Seismic data may be compiled into a two dimensional section, or gather. An example is illustrated in FIG. 1. In general, a set of such data may be denoted as P(t,x), where t and x represent time and space respectively. In the example of FIG. 1, the x-axis represents distance (space) in meters while the y-axis represents time in seconds. For this example, the samples are irregularly spaced and sparsely sampled. For the purpose of clarity, the traces are largely noiseless, showing only a number of recorded events 10, while outside of each high-amplitude event, the trace is essentially flat with zero amplitude. Furthermore, the data has been windowed such that the seismic events are fairly linear.

For data that are well sampled (i.e., sufficient sampling frequency, and sufficiently regularly in time) a Fourier transform may be computed using the fast Fourier transform (FFT) in accordance with Equation 1

$$P(\omega,t) = FT_t\{P(t,x)\} \quad (1)$$

where $FT_t$ is the temporal Fourier transform operator.

For each frequency $\omega$, taking the data as a function of x, Equation 2 may be written:

$$h(x) = P(\omega,x) \quad (2)$$

As noted above, the assumption may be made that the data are evenly sampled, so that an evenly sampled sequence of this function may be expressed as Equation 3:

$$h_n = h(n\Delta x) \quad n = 0,1, \ldots N-1, \quad (3)$$

The forward discrete Fourier transform (DFT) can be expressed as:

$$H_k = \sum_{n=0}^{N-1} h_n e^{-i\frac{2\pi}{N}kn} \quad k = 0,1, \ldots N-1, \quad (4)$$

and its inverse (IDFT) as:

$$h_n = \frac{1}{N}\sum_{k=0}^{N-1} H_k e^{i\frac{2\pi}{N}nk} \quad n = 0,1, \ldots N-1. \quad (5)$$

On the other hand, for an unevenly sampled sequence of this function:

$$h(x_m) \quad m = 0,1, \ldots, M-1, \quad (6)$$

with $0 \leq x_m < N\Delta x$. The Fourier spectrum may be estimated by:

$$\hat{H}_k = \sum_{m=0}^{M-1} w_m h(x_m) e^{-i\frac{2\pi}{N}k\frac{x_m}{\Delta r}} \quad k = 0, 1, \ldots, N-1, \tag{7}$$

where $$w_m = \begin{cases} \frac{x_1 - x_0}{\Delta x} & m = 0 \\ \frac{x_{m+1} - x_{m-1}}{2\Delta x} & 1 \leq m < M-2 \\ \frac{x_{m-1} - x_{m-2}}{\Delta x} & m = M-1 \end{cases} \tag{8}$$

Figure 2:
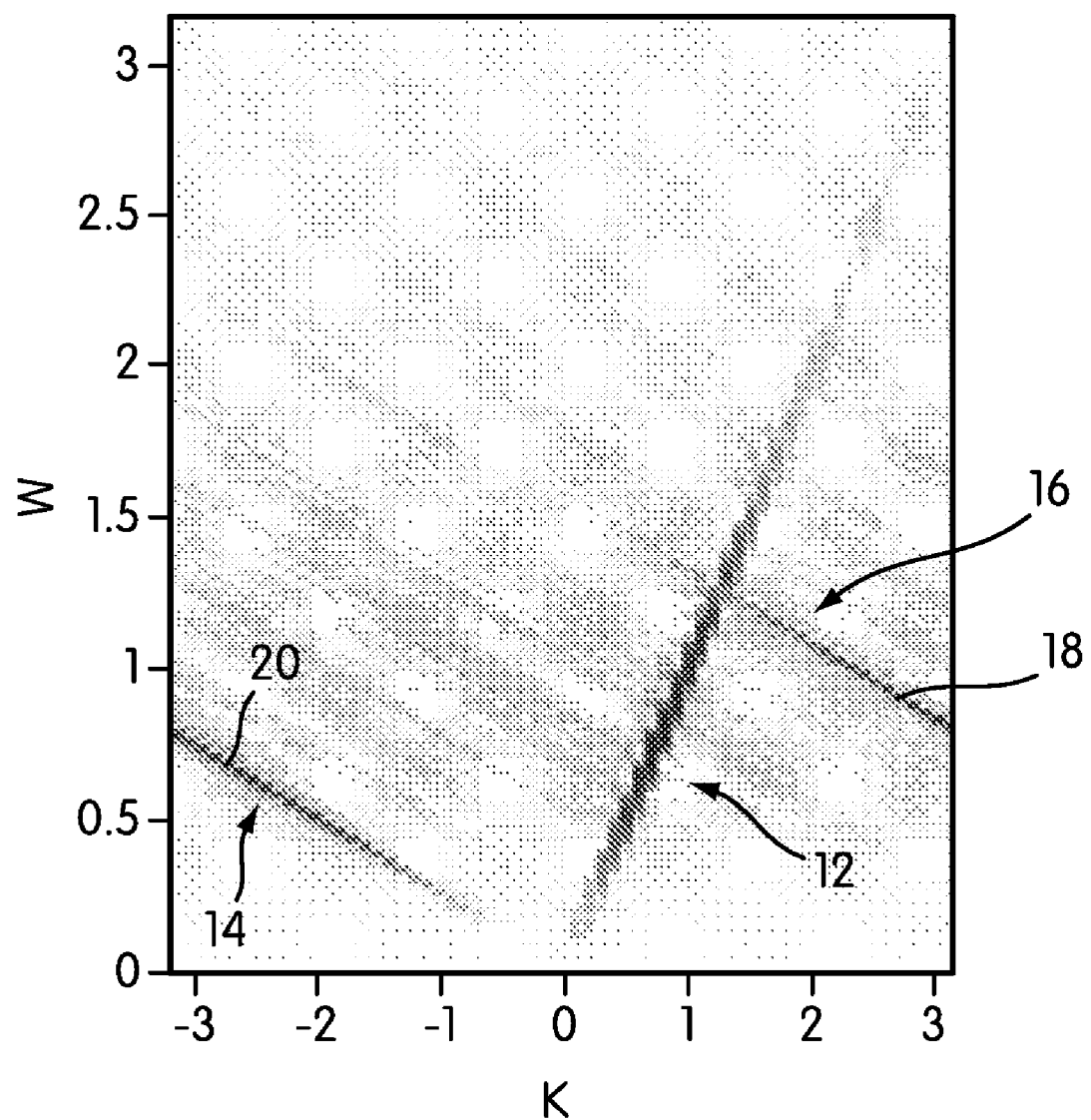
FIG. 2 illustrates f-k spectra for the gather of FIG. 1.

However, as noted above, irregularities of sampling and boundary effects can cause energy leakage when employing this method. FIG. 2 illustrates a graph of f-k spectra for the traces of FIG. 1. The dark lines 12, 14 passing through k=0 represent energy properly belonging to the seismic events 10. On the other hand, the dark line 16 line that fails to pass through k=0 represent aliased energy, i.e., an artifact of the sampling rather than actual information about the feature to be discerned from the seismic trace. Note that because the original traces are essentially noiseless, the extraneous energy patterns cannot be attributed to noise, but are entirely attributable to aliasing. Though not labeled due to their density, it can be seen in FIG. 2 that there are additional fine patterns of light and dark in the plot, generally extending parallel to both the aliased energy and the actual event energy, and that the event energy and the aliased energy are likewise generally parallel (i.e., true energies are aligned across the origin while aliased energies are not).

The inventor has determined that an anti-aliasing method can be employed to estimate the Fourier coefficients even for irregular and/or sparsely sampled data sets such as that illustrated in FIGS. 1 and 2.

For a given gather of unevenly sampled traces:

$$P(t,x_m) \, m=0,1,\ldots,M-1. \tag{9}$$

it is possible to use Equations (1) and (7) for each frequency to compute estimated Fourier coefficients:

$$\hat{P}(\omega,k) \, k=0,1,\ldots,N-1. \tag{10}$$

In order to reduce the contribution of aliased energy to the spectrum, an inhibiting function is defined. At the same time, the inhibiting function should retain the energy of the actual events that are under study. Equation 11 provides one example of such an inhibiting function:

$$\hat{W}(\omega, k) = \underset{\Delta\omega=-\Delta\Omega}{\overset{+\Delta\Omega}{\mathrm{Cov}}} \left| \hat{P}\left(\omega + \Delta\omega, k\left(1 + \frac{\Delta\omega}{\omega}\right)\right) \right|. \tag{11}$$

In this example, the inhibiting function is a covariance function, and its overall effect is to measure coherence of the signal along a line segment that crosses the origin in ω-k-space. Other measurements of coherence, for example, stacking in accordance with equation 12:

$$\hat{W}(\omega, k) = \sum_{\Delta\omega=-\Delta\Omega}^{+\Delta\Omega} \left| \hat{P}\left(\omega + \Delta\omega, k\left(1 + \frac{\Delta\omega}{\omega}\right)\right) \right| \tag{12}$$

may be used as necessary or desired. As can be seen in FIG. 2, the lines that pass through the ω-k origin represent the energy of interest and therefore by preferentially selecting energy that is coherent along such a line, the influence of aliased energy is reduced.

For three-dimensional analyses, k represents a radial component of wave-number. In general, this function will produce small values at spectral locations that represent aliased energy. In accordance with an embodiment of the present invention, the inhibiting function is used in conjunction with the Fourier spectra, as described above. This procedure improves the selection of true energy against aliased energy even when they are relatively indistinguishable in terms of power spectra.

One prior art method for reducing Fourier coefficient leakage involves an iterative loop in which Fourier coefficients are calculated, then those coefficients with maximum magnitude are selected. The contribution of those maximum magnitude coefficients is subtracted to re-orthogonalize:

$$h^{(l+1)}(x_m) = h^{(l)}(x_m) - \frac{1}{N} H_{k_l}^{(l)} e^{i\frac{2\pi}{N}k_l\frac{x_m}{\Delta x}} \quad m = 1, 2, \ldots, M-1 \tag{13}$$

which leads to:

$$H_{k_l} = H_{k_l} + H_{k_l}^{(l)} \tag{14}$$

Note that this method does not address the issue of high-power aliased energy. As can be seen in FIG. 2, it can be expected that at least a portion of the aliased energy may be indistinguishable from the true energy. See, for example, the portion 18 of the dark line 16 is comparable in strength to the portion 20 of dark line 14.

Furthermore, because there may tend to be a high computational cost for such an iterative procedure, certain steps may be taken to reduce such costs. In particular, it is possible to move the slow Fourier transform out of the iterative loop so that the data are processed within the wave-number domain within the entire loop. It can be shown that the re-orthogonalization process described above is equivalent to:

$$\hat{H}_k^{(l+1)} = \hat{H}_k^{(l)} - \hat{H}_{k_l}^{(l)} G(k - k_l), \tag{15}$$

where G(k) is a pre-computed function. As a result, the computational cost within the loop is now o(N), instead of o[N²]. As a special case, when spatial sampling is even, G(k) becomes a periodic δ function.

In an algorithm in accordance with an embodiment of the invention, a first step involves computation of all estimated Fourier coefficients $\hat{P}^{(0)}(\omega,k)$ from $P(\omega,x_m)$. As an initial starting point set $P(\omega,k)=0$. Once initialized, an iterative loop over l. The above-described inhibiting function $\hat{W}^{(l)}(\omega,k)$ is computed from $\hat{P}^{(l)}(\omega,k)$, then for each ω, the Fourier coefficient at $k_l$ with the maximal $\hat{W}^{(l)}(\omega,k)$ and $|P^{(l)}(\omega,l)|$ and is selected. The loop concludes with re-orthogonalization using equation (15), resulting in equation 16:

$$P(\omega,k) = P(\omega,k) + \hat{P}^{(l)}(\omega,k) \tag{16}$$

whereupon the loop is iterated from the computation of the inhibiting function for the remaining loops l.

Figure 3:
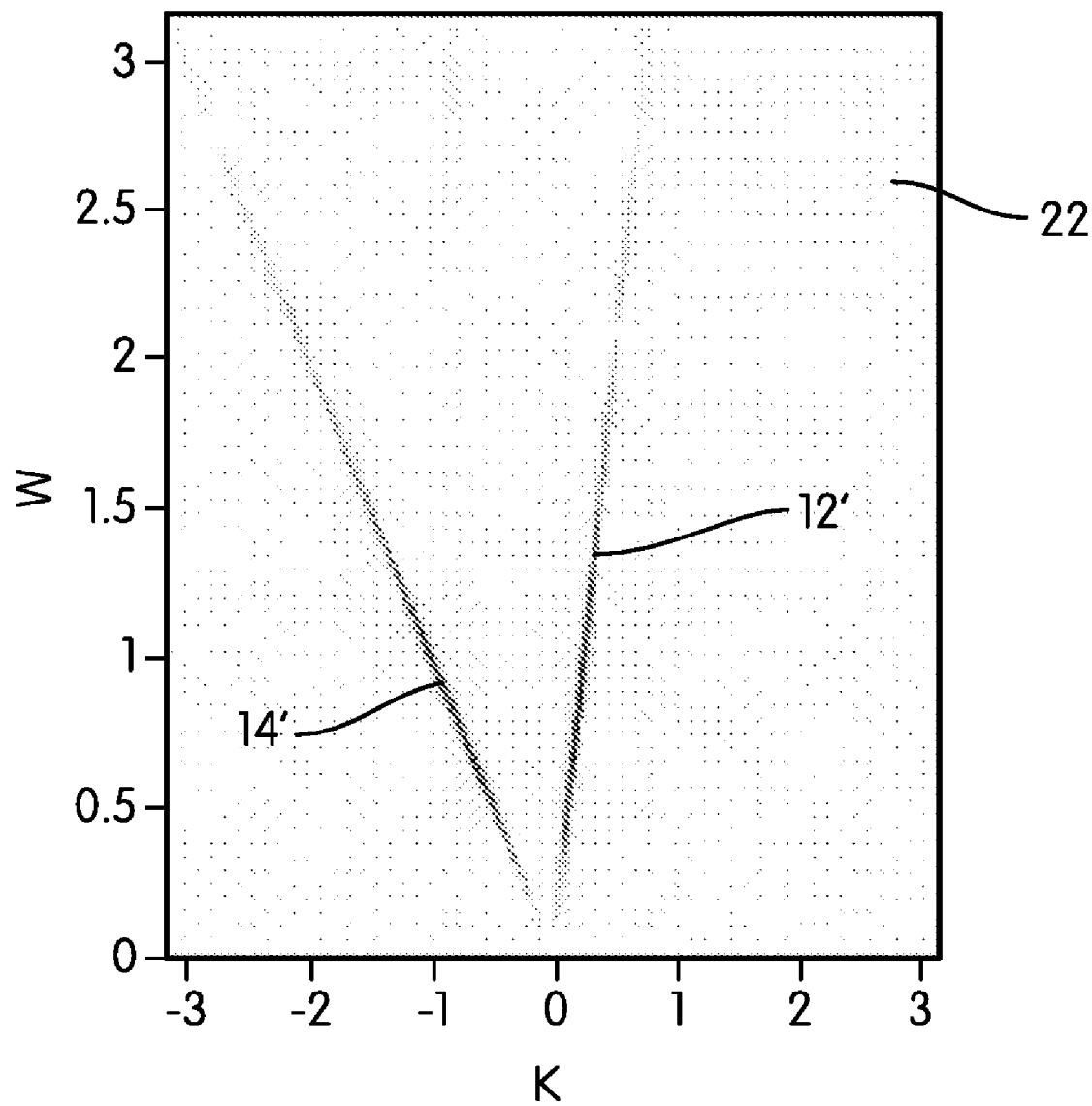
FIG. 3 illustrates the f-k spectra of FIG. 2 after application of a method in accordance with an embodiment of the present invention.

FIG. 3 illustrates an output of the foregoing algorithm as applied to the data of FIGS. 1 and 2. As may be seen, the two lines 12', 14', representing the transformed lines 12, 14 from FIG. 2 are more clearly distinguishable from the background 22. Line 18 and the faint pattern of darker and lighter background have been significantly reduced, if hot eliminated.

The angle between the two lines 12', 14' is more acute because the application of the algorithm has regularized the data such that they are sampled at the Nyquist frequency rendering all data in range.

Figure 4:
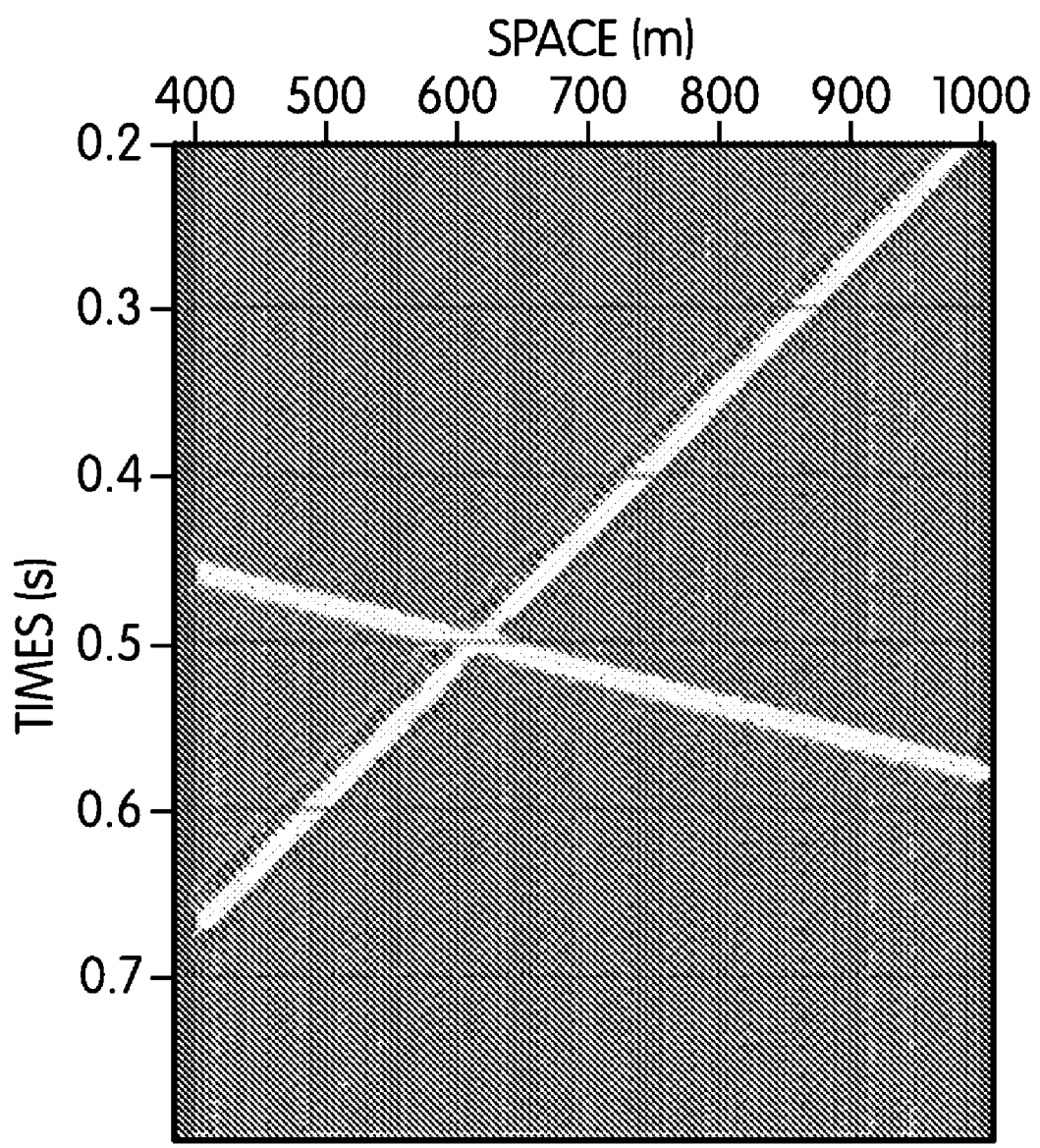
FIG. 4 illustrates ah inverse Fourier transform of the f-k spectra of FIG. 3.

Once the aliased energy has been removed, the inverse Fourier transform may be applied to the f-k spectra, resulting in the plot illustrated in FIG. 4. The regularized seismic data may then be interpreted and used to make determinations regarding the subsurface features of interest. Further, such information may be used in determinations regarding locations of hydrocarbon deposits or other geological features of interest.

Figure 5:
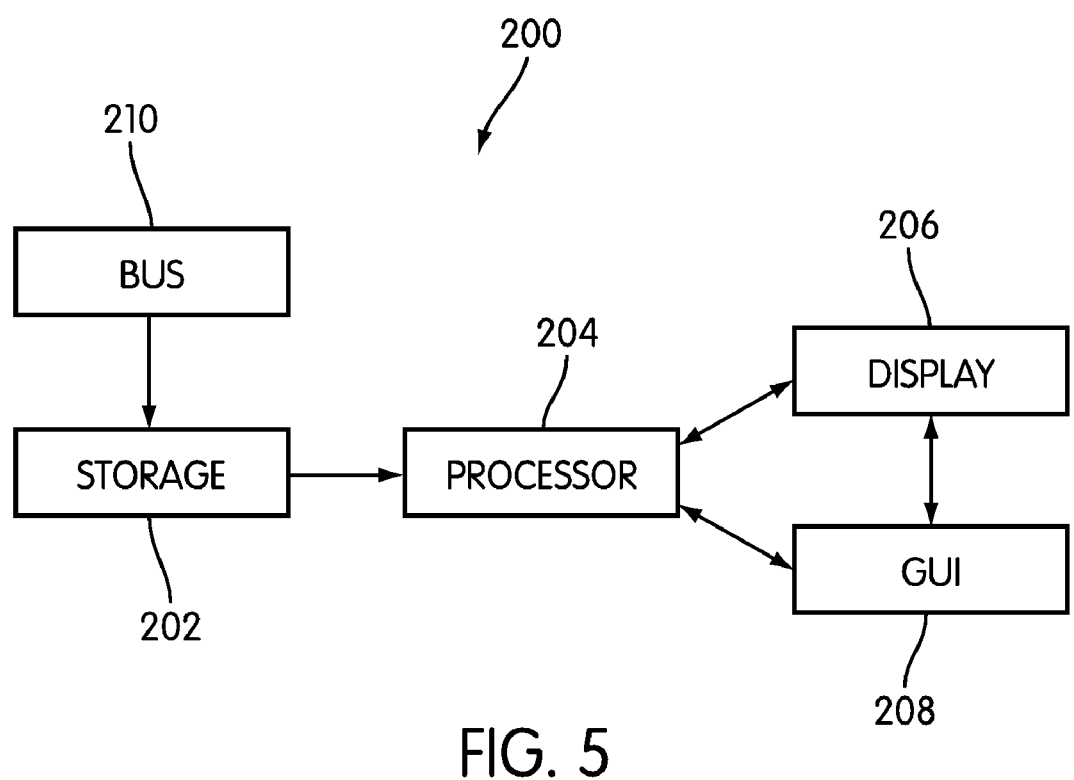
FIG. 5 is a schematic illustration of an embodiment of a system for performing methods in accordance with embodiments of the present invention.

A system for performing the method is schematically illustrated in FIG. 5. A system includes a data storage device or memory 202. The stored data may be made available to a processor 204, such as a programmable general purpose computer. The processor 204 may include interface components such as a display 206 and a graphical user interface 208. The graphical user interface may be used both to display data and processed data products and to allow the user to select among options for implementing aspects of the method. Data may be transferred to the system 200 via a bus 210 either directly from a data acquisition device, or from an intermediate storage or processing facility (not shown).

Although the invention has been described in detail for the purpose of illustration based oh what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to sparsely and irregularly sampled data, the method may likewise be applied to regularly and/or densely sampled data as well. Further, where reference is made to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of processing a sampled seismic trace representing information relating to a subsurface region, comprising:
   estimating Fourier coefficients of the seismic trace using a discrete Fourier transform;
   selecting from the estimated Fourier coefficients by applying a coherence criterion to the estimated Fourier coefficients to reduce an amount of aliased energy represented by the Fourier coefficients, wherein the coherence criterion is a measure of coherence to a line segment that crosses the origin in ω-k space;
   re-orthogonalizing, using a processor, in k-space, the selected coefficients; and
   using the re-orthogonalized coefficients to produce a seismic image of the subsurface region.

2. A method according to claim 1, further comprising:
   selecting, for each frequency, a Fourier coefficient having a maximum value of an aliasing inhibition function and a maximum magnitude of the discrete Fourier coefficients.

3. A method as in claim 1, wherein the coherence criterion comprises an inhibiting function $$\hat{W}(\omega, k) = \underset{\Delta\omega=-\Delta\Omega}{\overset{+\Delta\Omega}{\text{Cov}}} \left| \hat{P}\left(\omega + \Delta\omega, k\left(1 + \frac{\Delta\omega}{\omega}\right)\right) \right|.$$

4. A method as in claim 1, wherein the coherence criterion comprises a function that computes coherence along a line segment that crosses an origin in k-space.

5. A method as in claim 1, wherein the coherence criterion comprises stacking of amplitude spectrum $$\hat{W}(\omega, k) = \sum_{\Delta\omega=-\Delta\Omega}^{+\Delta\Omega} \left| \hat{P}\left(\omega + \Delta\omega, k\left(1 + \frac{\Delta\omega}{\omega}\right)\right) \right|.$$

6. A method as in claim 1, further comprising, after the re-orthogonalizing the selected coefficients, applying an inverse Fourier transform to obtain regularized seismic data.

7. A method of imaging a subsurface feature, comprising:
   receiving a sampled seismic trace including information relating to the subsurface feature;
   estimating Fourier coefficients of the seismic trace using a discrete Fourier transform;
   selecting from the estimated Fourier coefficients by applying a coherence criterion to the estimated Fourier coefficients to reduce an amount of aliased energy represented by the Fourier coefficients, wherein the coherence criterion is a measure of coherence to a line segment that crosses the origin in ω-k space;
   re-orthogonalizing, using a processor, in k-space, the selected coefficients; and
   applying an inverse Fourier transform to the re-orthogonalized coefficients to produce regularized seismic data.

8. A method as in claim 7, further comprising displaying, based on the regularized seismic data, a seismic trace image.

9. A method as in claim 7, further comprising:
   selecting, for each frequency, a Fourier coefficient having a maximum value of an aliasing inhibition function and a maximum magnitude of the fast Fourier coefficients.

10. A method as in claim 7, wherein the coherence criterion comprises an inhibiting function $$\hat{W}(\omega, k) = \underset{\Delta\omega=-\Delta\Omega}{\overset{+\Delta\Omega}{\text{Cov}}} \left| \hat{P}\left(\omega + \Delta\omega, k\left(1 + \frac{\Delta\omega}{\omega}\right)\right) \right|.$$

11. A method as in claim 7, wherein the coherence criterion comprises a function that computes coherence along a line segment that crosses an origin in k-space.

12. A method as in claim 7, further comprising, using the regularized seismic data in determining a probability of existence of hydrocarbon resources in a vicinity of the subsurface feature.

13. A system for imaging seismic data relating to a subsurface feature, comprising:
   a data storage device having computer readable data including data relating to a sampled seismic trace including information relating to the subsurface feature;
   a processor, configured and arranged to execute machine executable instructions stored in a processor accessible memory for performing a method comprising:
      estimating Fourier coefficients of the seismic trace using a discrete Fourier transform;
      selecting from the estimated Fourier coefficients by applying a coherence criterion to the estimated Fourier coefficients to reduce an amount of aliased energy represented by the Fourier coefficients, wherein said coherence criterion is a measure of coherence to a line segment that crosses the origin in $\omega$-k space;

re-orthogonalizing, in k-space, the selected coefficients; and applying an inverse Fourier transform to the re-orthogonalized coefficients to produce regularized seismic data.

* * * * *